United States Patent Office 3,135,595
Patented June 2, 1964

3,135,595
METHOD OF PROVIDING FERTILIZER FROM METAL MINE WASTE
Ben F. Williams, P.O. Box 1051, Douglas, Ariz.
No Drawing. Filed June 13, 1962, Ser. No. 202,072
3 Claims. (Cl. 71—25)

This invention relates primarily to material for beneficiating the soil and also to material useful as an adjunct to livestock feed.

In many parts of the country, particularly in the relatively arid Southwest, the soil generally is initially fertile when irrigated but after irrigation and the removal of repeated crops therefrom the soil becomes of decreasing value. This is largely because the water soluble mineral elements are leached from the ground by the irrigating water and are extracted from the soil by the removed produce. While very high growth rates can sometimes be attained upon initial use of the native soil, it is found after irrigation for a relatively short period that the productivity lessens markedly.

It is also true that in various locations in the country and particularly in the same Southwest regions there are available large quantities of waste mineral materials situated in mine dumps. These are the result of extensive mining operations, particularly copper mining operations. The wastes in the mine dumps have been weathered for a number of years. A large proportion of the dump contents, being the remainder after the extraction of much of the metallic copper therefrom, are in oxidized form.

It is therefore an object of the invention to provide an economical and effective method for recovering the natural, water soluble elements from native rock and from ore mining wastes and to make such water soluble materials available for use as an effective soil fertilizer for the growing of crops and as an additive to animal feeds.

Another object of the invention is to provide a method of obtaining or producing fertilizer in a form which can readily be utilized in connection with irrigation or livestock water and which is of a chemical constituency so that it is valuable as a feed additive, soil additive and fertilizer.

Another object of the invention is to provide a process of providing a fertilizer material which will improve the character of the soil by making the soil more pervious to water and air.

A still further object of the invention is to provide an additive and fertilizer material which is somewhat acid in nature so that when applied, the natural alkalinity of the soil is in part offset and reduced.

While the method of the invention can be carried out in a number of different ways, it has successfully been practiced substantially as described herein, although variations in the method are entirely possible within the scope of the appended claims.

The principal practical experience with the method of my invention has been gained in the arid Southwest of the United States, particularly in southern Arizona and also in Sonora, northern Mexico. In the vicinity of Douglas, Arizona, there are large tailings or waste piles resulting from the operation of copper mines. The naturally occurring ore after excavation and treatment for the removal of much of the contained metallic copper is dumped in piles and left to weather, sometimes for many years. The particular copper mine waste dump with which the present process has been effectively carried out is that known as the "Sacramento Hill Dump" near Bisbee, Arizona. The materials in that waste dump have been weathered and oxidized to the point of having the sulfides of the different metals contained therein converted to sulfates of those metals and thereby rendered water soluble.

As a first step in practicing the method of my invention, I take local water and let it run over and in contact with the exposed material in the mine waste dump so as to extract the water soluble contents thereof. The water is preferably recirculated a number of times, increasing the amount of solute each cycle. The recirculation of the water is continued as long as may be desirable up to the point of saturation with the principal water soluble materials, but in usual practice I have found that it is beneficial to circulate the liquid, referred to as pregnant liquid, until it has a specific gravity of about 26° Baumé and also has a pH of about 1.

The so-obtained pregnant liquid is corrosive and has sufficient copper sulfate dissolved in it so that it is toxic and detrimental to growing material. The pregnant liquid also contains a large quantity of iron in solution, mostly in the form of ferric sulfate ($Fe_2(SO_4)_3$) with a minor amount of ferrous sulfate ($FeSO_4$) in addition to a number of other soluble elements usually referred to as trace elements and as indicated in a table hereinafter.

The pregnant liquid after the indicated recirculation is transferred to a processing tank. Conveniently this is an open vat made in such a way that it is inert to the liquid material in it. The tank is also preferably provided with agitating devices or stirrers. In the tank the pregnant liquid is commingled with metallic iron. This is conveniently accomplished by adding scrap iron or miscellaneous relatively finely divided or small pieces of ordinarily available iron to the contents of the tank. The addition of the metallic iron has the effect of reducing the ferric sulfate to ferrous sulfate and also precipitates a large amount of previously unrecovered copper. The precipitated metallic copper drops to the bottom of the processing tank and can be removed in any convenient way that is usual with metallic copper. Not all of the copper in the pregnant liquid is removed in this fashion. A relatively small amount remains. This is an amount which has been demonstrated to be not harmful, but beneficial to plant life and to livestock.

In addition to adding metallic iron to the pregnant liquid in the processing tank, I also arrange that the pH of the liquid be held certainly below the value of 3.6 and preferably in the neighborhood of 2.5. This increase in acidity or limitation on the reduction of acidity is accomplished by adding sulfuric acid to the liquid. In practice it requires about thirty gallons of sulfuric acid per thousand gallons of solution to keep the pH less than 2.5. This is a desirable pH value since if the value exceeds about 3.6 then ferric hydroxide and ferrous hydroxide are precipitated.

If the agitators within the processing tank are operated, the reaction with the metallic iron is expedited and the reaction cycle can be completed in a very few hours, typically four hours.

The various chemical reactions which occur during the course of treatment in the processing tank are set forth as follows:

(1) $Fe + CuSO_4 \rightarrow Cu\downarrow + FeSO_4$
(2) $Fe_2(SO_4)_3 + Fe \rightarrow 3FeSO_4$
(3) $H_2SO_4 + Fe \rightarrow FeSO_4 + H_2\uparrow$
(4) $Fe_2(SO_4)_3 + Cu \rightarrow CuSO_4 + FeSO_4$
(5) $Fe_2(SO_4)_3 + 6H_2O \rightleftarrows 3H_2SO_4 + 2Fe(OH)_3$
(6) $FeSO_4 + 2H_2O \rightleftarrows Fe(OH)_2 + H_2SO_4$ Upon completion of the operations in the processing tank, it is found, within reasonable variations depending upon the particular waste dump material utilized and depending also upon some variations in the extent of initial water circulation and also taking into account normal variables in the processing tank, that the characteristics of the final liquid are about as follows:

The pH is from 2.0 to 2.5; the weight of the liquid and its contents is approximately 10.5 pounds per gallong; the color of the liquid is light green; and it is slightly corrosive.

The chemical analysis of the liquid on the basis of pounds per one thousand galls is as follows:

| | |
|---|---:|
| Iron as ferrous sulfate | 1,474.00 |
| Copper as copper sulfate | 1.80 |
| Manganese as manganese sulfate | 11.70 |
| Zinc as zinc sulfate | 5.80 |
| Magnesium as magnesium sulfate | 98.50 |
| Sulfur in excess of that contained in above combinations calculated as $SO_4$ | 846.00 |

The liquid upon semiquantitative spectrographic analysis is as follows:

| | |
|---|---:|
| Silicon | 0.064 |
| Calcium | 0.160 |
| Aluminum | 1.500 |
| Boron | Nil |
| Lead | Trace |
| Bismuth | Nil |
| Molybdenum | Nil |
| Tin | 0.0086 |
| Sodium | Nil |
| Titanium | Nil |
| Silver | Nil |
| Nickel | 0.0049 |
| Cobalt | 0.0054 |
| Chromium | 0.0036 |
| Vanadium | Trace |
| Other elements | Nil |

While the forgoing analyses are representative, it is recognized that the results will differ somewhat, largely depending upon the source of the initial material. For commercial reasons I often make admixtures of source materials from different sites in order to afford a more nearly uniform product.

After the materials have been treated as described in the processing tank, the supernatant liquid is removed from the tank and is stored in suitable containers.

The containers are transported to a location for use. For cropland the liquid is preferably applied by being admixed with the usually used irrigation water and is applied to the soil along with the irrigation water, although it can be directly applied, usually in diluted form, by spraying. As an admix or adjunct to livestock feed, the liquid can be added to drinking water. Also, the liquid can be evaporated to remove the carrying water and the remaining solids can be distributed on the ground for crops or can be added to feed or to salt blocks for livestock. It is contemplated that the material may serve as a food supplement for human consumption, but clinical work has as yet not been accomplished.

Actual experiences with the material produced according to the described process and in the geographical area above indicated are as follows:

*Parcel No. 1.*—Forty-six acres of cotton were planted in two plots. A 20 acre plot was treated by applying the subject material at the rate of 25 gallons per acre by adding it to the pre-plant irrigation water.

A 26 acre plot immediately adjoining the 20 acre plot "did not" have the subject material applied to the land.

To both the 20 acre plot and the 26 acre plot there was applied 150 lbs. per acre of $NH_3$.

The 20 acre plot was irrigated 3 times after planting with almost no "tail-watering." All 46 acres (both the 20 acre plot and the 26 acre plot) were "solid plant" and, except for the above-described differences, were treated in the same manner.

The final yield from the 26 acre plot (not treated with the subject material) was 928 lbs. of lint cotton per acre.

The final yield on the 20 acre plot (treated with the subject material) was 1500 lbs. of lint cotton per acre with a turnout percentage of 37.6% and a 1⁵⁄₃₂" middling size of hand picked cotton and 1⅛" on machine picked cotton.

*Parcel No. 2.*—An 8½ acre plot was solid planted after having been treated with the subject material at the rate of 25 gallons per acre, added to the pre-plant water.

This plot was irrigated 4 times after planting. To this plot, 150 lbs. per acre of $NH_3$ were applied.

The final yield on this plot was 1596 lbs. of lint cotton per acre of the same quality as the cotton produced from the 20 acre plot in parcel 1 above.

*Over-all results.*—In addition to the cotton planted in parcel No. 1 and parcel No. 2 above, there were planted another 44 acres of cotton in the immediate vicinity. Because of weather conditions and weather damage, some of these 44 acres were planted or re-planted.

Including parcel No. 1 and parcel No. 2 and the additional 44 acres planted, there was a total of 98½ acres of cotton planted. Twenty-eight and one-half acres were treated with the subject material as described above with an average yield of 1535 lbs. of "lint cotton" per acre. The remaining 70 acres (not treated with the subject material) produced an average yield of 641 lbs. of lint cotton per acre.

By the use of this fertilizing and soil conditioning material the total amount of irrigating water can be reduced over that normally employed. This saving in irrigation water is a major factor in the areas described. The soil is substantially loosened and left less compact. The quantity of the fertilizer employed ranges from twenty-five to fifty gallons per acre, but can of course extend over a substantial range of variation depending upon local conditions, particularly the time of application, the number of irrigations and the nature of the crops as well as the nature of the land.

What is claimed is:

1. A method of providing fertilizer from a metal mine waste dump containing sulfates of copper, iron, manganese, zinc and magnesium comprising
   (1) circulating water through the weathered and oxidized material of said waste dump to extract the water soluble contents thereof and thereby provide a pregnant liquid having a pH of about 1 and a specific gravity of about 26° Beaumé and containing copper sulfate, ferric sulfate and ferrous sulfate,
   (2) transferring said pregnant liquid to a processing tank,
   (3) adding metallic iron to said pregnant liquid in said processing tank thereby precipitating therefrom most but not all of the copper as metallic copper and reducing the ferric sulfate to ferrous sulfate,
   (4) adjusting the PH of the liquid in the processing tank to the neighborhood of 2.5 by adding sulfuric acid thereto, and
   (5) withdrawing the supernatant liquid from the tank for use as fertilizer, said liquid having a chemical analysis on the basis of pounds per one thousand gallons, approximately as follows:

| | |
|---|---:|
| Iron as ferrous sulfate | 1,474.00 |
| Copper as copper sulfate | 1.80 |
| Manganese as manganese sulfate | 11.70 |
| Zinc as zinc sulfate | 5.80 |
| Magnesium as magnesium sulfate | 98.50 |
| Sulfur in excess of that contained in above combinations calculated as $SO_4$ | 846.00 |

2. A method of providing fertilizer from a metal mine waste dump containing water soluble copper sulfate, ferrous sulfate and ferric sulfate comprising
   (1) dissolving material from said metal mine waste dump in water to provide a water solution containing copper sulfate, ferric sulfate and ferrous sulfate,
   (2) isolating said water solution,
   (3) adding metallic iron to said isolated solution to precipitate excess copper and to reduce the contained ferric sulfate to ferrous sulfate, (4) adding sulfuric acid to the isolated solution until the pH thereof is about 2.5, and
(5) then separating the supernatant liquid from said precipitated copper by withdrawing said supernatant liquid from said isolated solution for use as a fertilizer.

3. A method of providing fertilizer from a copper mine waste dump containing copper sulfate, ferrous sulfate and ferric sulfate comprising
(1) circulating water through the material of said copper mine waste dump to provide a pregnant liquid containing copper sulfate, ferrous sulfate and ferric sulfate and having a pH of about 1,
(2) transferring said pregnant liquid to a processing tank,
(3) adding metallic iron to said pregnant liquid in said processing tank and thereby precipitating metallic copper,
(4) adjusting the pH of the liquid contents of the processing tank to about 2.5 by adding sulfuric acid thereto, and
(5) then separating the supernatant liquid from said precipitated copper by withdrawing said supernatant liquid from said tank for use as a fertilizer.

References Cited in the file of this patent
UNITED STATES PATENTS

| | | |
|---|---|---|
| 646,559 | Reissmueller | Apr. 3, 1900 |
| 2,502,484 | Saunders | Apr. 4, 1950 |
| 2,983,594 | Jost | May 9, 1961 |